United States Patent
Campbell et al.

(10) Patent No.: US 7,770,265 B2
(45) Date of Patent: Aug. 10, 2010

(54) CABLE TERMINATION WITH AN ANGULARLY OFFSET PARABOLIC WALL PROFILE

(75) Inventors: Richard Vest Campbell, Tallahassee, FL (US); John Wiley Horton, Tallahassee, FL (US)

(73) Assignee: Bright Technologies, LLC., Havana, FL (US)

( * ) Notice: Subject to any disclaimer, the term of this patent is extended or adjusted under 35 U.S.C. 154(b) by 121 days.

(21) Appl. No.: 12/012,871

(22) Filed: Feb. 6, 2008

(65) Prior Publication Data

US 2009/0193627 A1    Aug. 6, 2009

(51) Int. Cl.
*F16G 11/00* (2006.01)
(52) U.S. Cl. ............ 24/129 R; 24/122.6; 24/136; 403/371; 52/223.13
(58) Field of Classification Search ............... None
See application file for complete search history.

(56) References Cited

U.S. PATENT DOCUMENTS 2,686,963 A * 8/1954 Freyssinet .................. 264/249

* cited by examiner

*Primary Examiner*—Jack W. Lavinder
(74) *Attorney, Agent, or Firm*—J. Wiley Horton

(57) ABSTRACT

An anchor having an internal passage defined by a revolved wall profile. The anchor is conceptually divided into four regions: a neck region, a transition region, a mid region, and a distal region. Each of these regions has its own design considerations. A portion of a parabola is used to define at least part of the revolved wall profile. The parabolic portion is preferably used in at least the neck and mid regions. In order to create a tangency condition proximate the neck anchor boundary, the parabola used to create the wall profile is angularly offset from the wall profile's axis of rotation.

21 Claims, 18 Drawing Sheets

CABLE TERMINATION WITH AN ANGULARLY OFFSET PARABOLIC WALL PROFILE

MICROFICHE APPENDIX

Not Applicable

BACKGROUND OF THE INVENTION

1. Field of the Invention

This invention relates to the field of cables and cable terminations. More specifically, the invention comprises a cable termination including an angularly offset parabolic wall profile.

2. Description of the Related Art

There are many known devices for mounting a termination on the end of a wire, rope, or cable. The individual components of a wire rope are generally referred to as "strands," whereas the individual components of natural-fiber cables or synthetic cables are generally referred to as "fibers." For purposes of this application, the term "strands" will be used generically to refer to both.

In order to carry a tensile load an appropriate connective device must be added to a cable. A connective device is typically added to an end of the cable, but may also be added at some intermediate point between the two ends. FIG. 1 shows a connective device which is well known in the art. An anchor 18 has been attached to the free end of a cable 10 to form a termination 14.

FIG. 2 shows the same assembly sectioned in half to show its internal details. Anchor 18 includes internal passage 28 running through its mid portion. In order to affix anchor 18 to cable 10, the strands proximate the end of cable 10 are exposed and placed within internal passage 28 (They may also be splayed or fanned to conform to the expanding shape of the passage).

Liquid potting compound is added to the region of strands lying within the anchor (either before or after the strands are placed within the anchor). This liquid potting compound solidifies while the strands are within the anchor to form potted region 16 as shown in FIG. 2. Most of potted region 16 consists of a composite structure of strands and solidified potting compound. Potting transition 20 is the boundary between the length of strands which is locked within the solidified potting compound and the freely-flexing length within the rest of the cable (flexible region 30).

The unified assembly shown in FIGS. 1 and 2 is referred to as a "termination" (designated as "14" in the view). The mechanical fitting itself is referred to as an "anchor" (designated as "18" in the view). Thus, an anchor is affixed to a cable to form a termination. These terms will be used consistently throughout this disclosure.

Cables such as the one shown in FIG. 2 are used to carry tensile loads. When a tensile load is placed on the cable, this load must be transmitted to the anchor, and then from the anchor to whatever component the cable attaches to (typically through a thread, flange, or other fastening feature found on the anchor). As an example, if the cable is used in a winch, the anchor might include a large hook.

Those skilled in the art will realize that potted region 16 is locked within anchor 18 by a mechanical interference resulting from the geometry of internal passage 28. FIG. 3 is a sectional view showing the potted region removed from the anchor. As shown in FIG. 3, internal passage 28 molds the shape of potted region 16 so that a mechanical interference is created between the two surfaces (which in this case are conical surfaces). When the potted region first solidifies, a surface bond is often created between the potted region and the wall of the tapered cavity. When the cable is initially loaded, the potted region is pulled downward (with respect to the orientation shown in the view) within the tapered cavity. This action is often referred to as "seating" the potted region. The surface bond typically fractures. Potted region 16 is then retained within tapered cavity 28 solely by the mechanical interference of the mating male and female conical surfaces.

FIG. 4 shows the assembly of FIG. 3 in a sectioned elevation view. The wall profile is revolved around central axis 51, which runs through the anchor from neck anchor boundary 48 to distal anchor boundary 50. One can define the slope of the wall profile at any point along the internal passage with respect to this central axis. For purposes of this disclosure, a positive slope for the wall profile will mean a slope in which the distance from the central axis to the wall is increasing as one proceeds from the proximal anchor boundary to the distal anchor boundary.

As mentioned previously, the seating process places considerable shearing stress on the surface bond between the potted region and the wall, which often breaks. Further downward movement is arrested by the compressive forces exerted on the potted region by the shape of the internal passage (Spatial terms such as "downward", "upper", and "mid" are used throughout this disclosure. These terms are to be understood with respect to the orientations shown in the views. The assemblies shown can be used in any orientation. Thus, if a cable assembly is used in an inverted position, what was described as the "upper region" herein may be the lowest portion of the assembly).

The compressive stress on potted region 16 tends to be maximized in neck region 22. Flexural stresses tend to be maximized in this region as well, since it is the transition between the freely flexing and rigidly locked regions of the strands. The tensile stresses within potted region 16 likewise tend to be maximized in neck region 22, since it represents the minimum cross-sectional area. Thus, it is typical for terminations such as shown in FIGS. 1-4 to fail within neck region 22.

In FIG. 4, potted region 16 is conceptually divided into neck region 22, mid region 24, and distal region 26. Potting transition 20 denotes the interface between the relatively rigid potted region 16 and the relatively freely flexing flexible region 30. Stress is generally highest in neck region 22, lower in mid region 24, and lowest in distal region 26.

The prior art anchor shown in FIGS. 1-4 uses a revolved linear wall profile (a conical shape for the internal passage). While this profile is commonly used, it is far from optimum. The design considerations present in the neck region, mid region, and distal region are quite different. FIG. 5 illustrates—in very general terms—the nature of these design considerations. In neck region 22, the wall profile is preferably tangent or nearly tangent to the cable's outside diameter. Thus, tangent wall 32 is ideal for neck region 22.

The solidified potted region expands as one proceeds from the anchor's neck region toward the distal region. A relatively rapid expansion can be used to form a "shoulder" in the wall profile. FIG. 5 shows a shoulder 34 formed by a relatively steeply sloping wall profile in mid region 24. This forms a solid mechanical interference which will hold the potted mass in place. The potted mass lying between the shoulder and the neck region is preferably allowed to elongate ("seat") somewhat under tension, thereby forming a more even stress distribution. Thus, the inclusion of a shoulder is preferable for the mid region.

Of course, if one continues the steeply sloping wall profile of the shoulder toward the anchor's distal end, the anchor will have to be made very large to contain the profile. The stress tends to diminish as one approaches the distal region. Thus, there is little to be gained by continuing the steeply sloping profile of the shoulder. At some point it is preferable to discontinue the sloping wall profile and employ a profile having a more moderate slope. FIG. 5 shows the use of such a portion, which is designated as extension wall 36.

The reader will thereby perceive the differing and somewhat contradictory design goals present in the anchor's neck, mid, and distal regions. Several prior art anchors have attempted to reconcile these conflicting goals. FIG. 6 is a sectioned elevation view of one such prior art anchor. The wall profile is a revolved constant radius arc 38 (revolved around central axis 51). Arc center 40 is positioned so that tangency point 74 is created with the cable at the point where the cable exits the anchor. Thus, the goal of creating tangency with the cable is met.

The goal of creating a shoulder in the mid region can also be met using a constant radius arc. The reader will observe in the example illustrated that the wall profile has a fairly steep slope in the mid region, thereby forming a suitable shoulder 34. The problem with the use of the constant radius arc in this fashion is the slope existing between tangency point 74 and the shoulder. The wall's slope increases fairly rapidly as one proceeds from tangency point 74 toward the distal anchor boundary. A more gradually increasing slope is preferable, since this would allow the potted mass in the vicinity of the neck to elongate somewhat under tension. This elongation produces a more even stress distribution. However, the rapidly increasing slope inherent in the constant radius arc design prevents the solidified potted region in the vicinity of the neck from elongating without experiencing excessive compressive stress. Thus, the use of the constant radius arc tends to concentrate stress in the neck region. The result is an anchor which fails below the ultimate tensile strength of the cable itself.

FIG. 7 shows another prior art geometry which attempts to address the problem of stress concentration in the neck region. In the anchor illustrated in FIG. 7, the revolved wall is defined by a portion of a parabola 42. The parabola's focus 44 is positioned appropriately—and the constants governing the parabola are appropriately selected—to produce a wall profile such as shown. Parabolic wall 45 includes a shoulder 34 in the mid region. It also includes a slope in the neck region which is not rapidly changing (and therefore produces a reasonably even stress distribution in the neck region). However, the reader will observe the presence of non-tangent condition 46 at the neck anchor boundary. This non-tangent condition produces a significant stress concentration at the point where the cable exits the neck anchor boundary.

Those skilled in the art will readily appreciate that one way to create a tangent condition at the neck anchor boundary using a parabola is to make the outside diameter of the cable an asymptote of the parabola. Unfortunately, making the outside diameter of the cable an asymptote will mean that the parabolic wall profile will have insufficient slope to form the necessary mechanical interference. This explains why anchors using parabolic wall profiles have been forced to use a non-tangent condition at the neck anchor boundary. The result is an undesirable stress concentration in the neck region. Like the version using the constant radius arc, the termination of FIG. 7 tends to fail well short of the cable's ultimate tensile strength.

An ideal wall geometry will include a tangent condition at the neck anchor boundary, a shoulder in the mid region, and an appropriate stress distributing transition in the wall slope therebetween. The present invention achieves these goals, as will be explained.

BRIEF SUMMARY OF THE PRESENT INVENTION

The present invention comprises an anchor having an internal passage defined by a revolved wall profile. The anchor is conceptually divided into four regions: a neck region, a transition region, a mid region, and a distal region. Each of these regions has its own design considerations. A portion of a parabola is used to define at least part of the revolved wall profile. The parabolic portion is preferably used in at least the neck and mid regions. In order to create a tangency condition proximate the neck anchor boundary, the parabola used to create the wall profile is angularly offset from the wall profile's axis of rotation. The amount of angular offset, the displacement of the parabola's focus, and the parameters defining the parabola, are all preferably selected to create a tangency (or near-tangency) between the extreme of the parabolic portion nearest the distal anchor boundary and the outside diameter of the cable.

Figure 1:
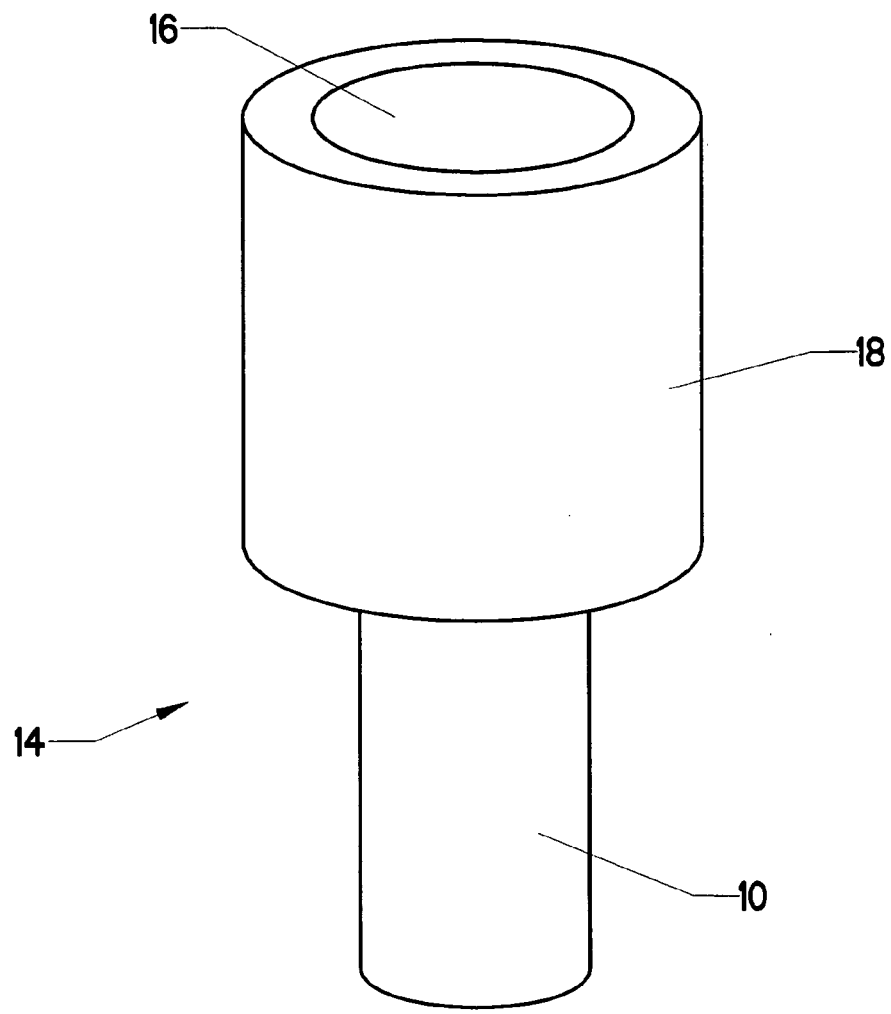
FIG. 1 is a perspective view, showing a prior art termination.
Figure 2:
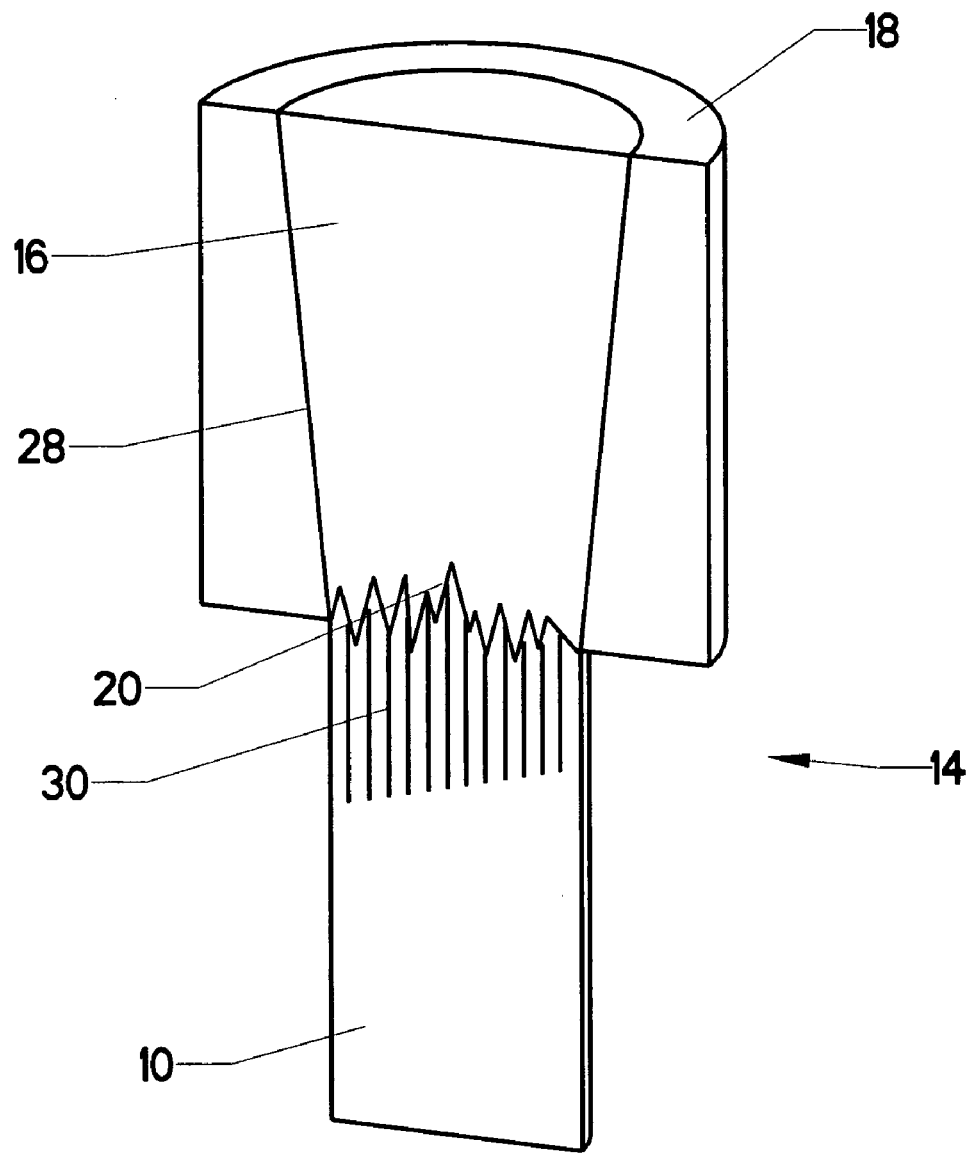
FIG. 2 is a sectioned perspective view, showing internal features of a prior art termination.
Figure 3:
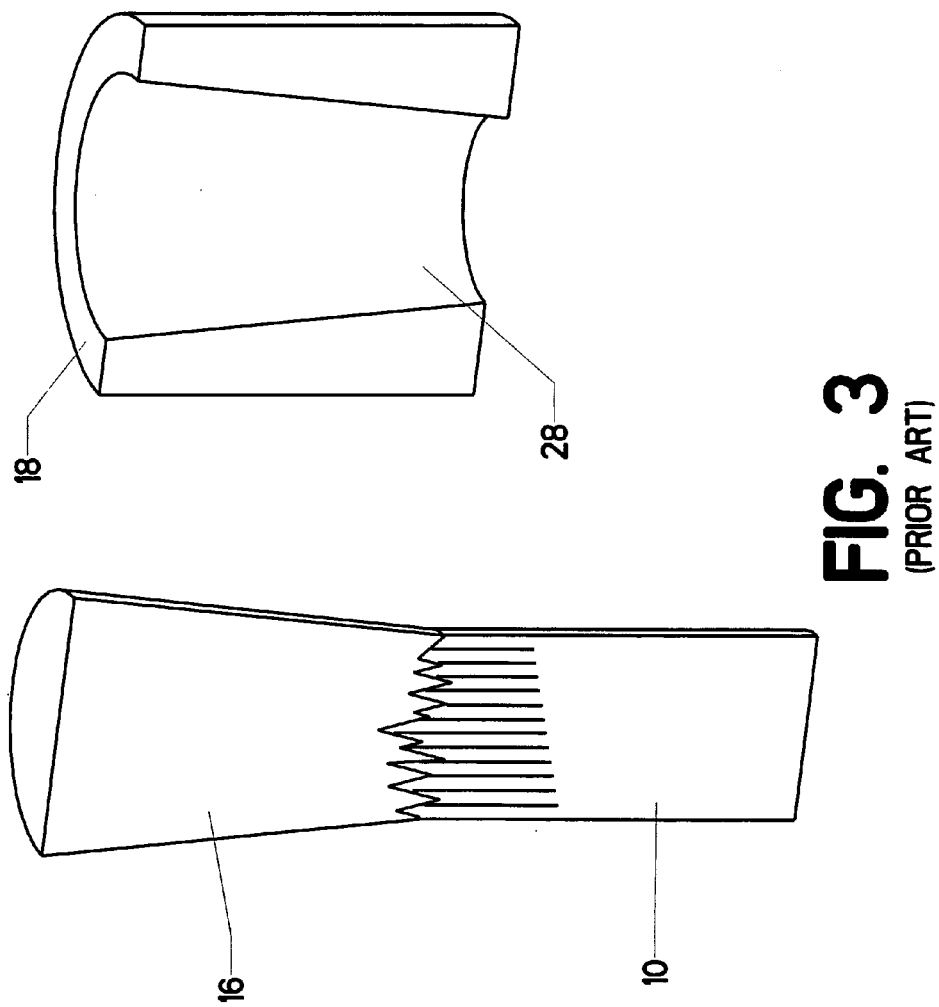
FIG. 3 is a sectioned and exploded perspective view, showing internal features of a prior art termination.
Figure 4:
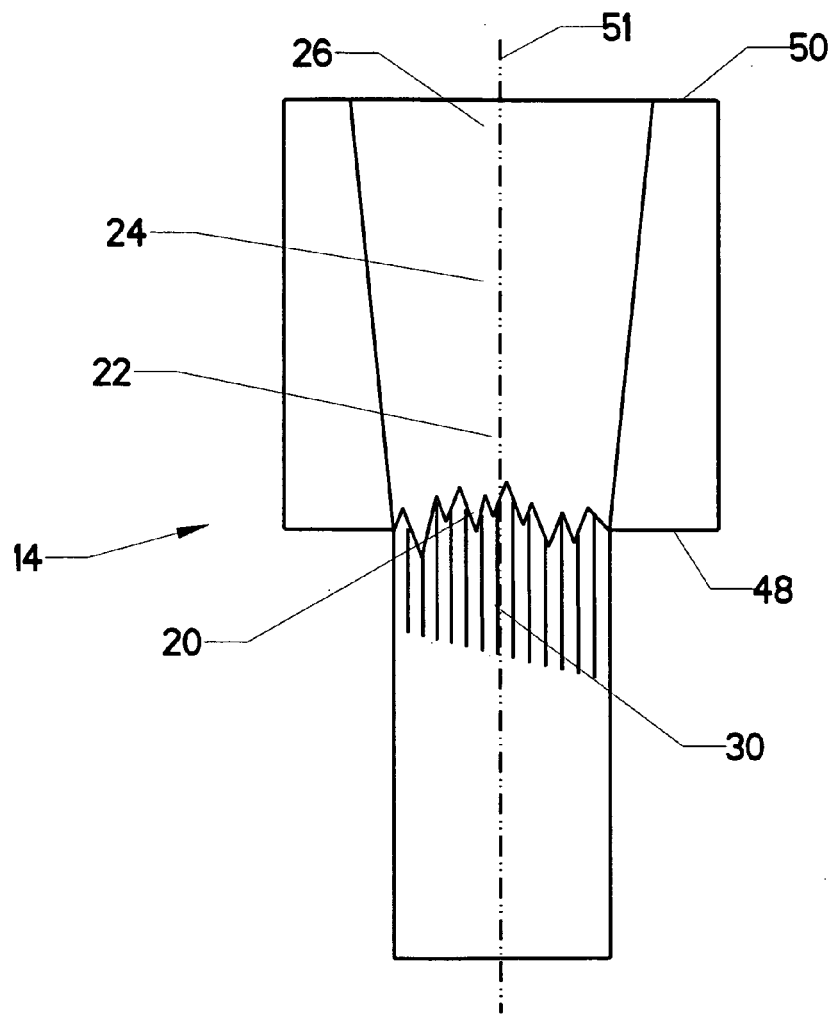
FIG. 4 is a sectioned elevation view, showing internal features of a prior art termination.
Figure 5:
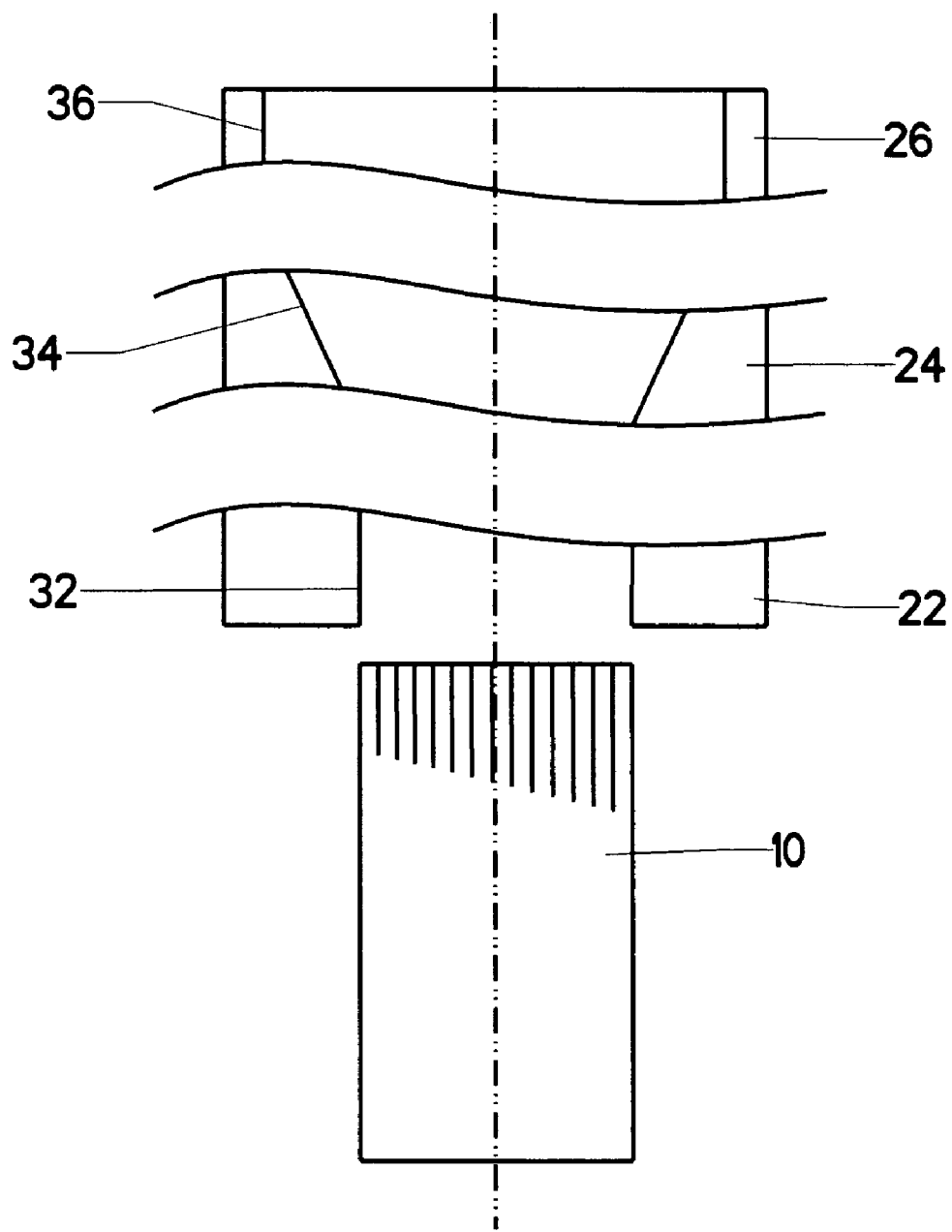
FIG. 5 is an exploded elevation view, showing the conflicting design constraints for different regions of a termination.
Figure 6:
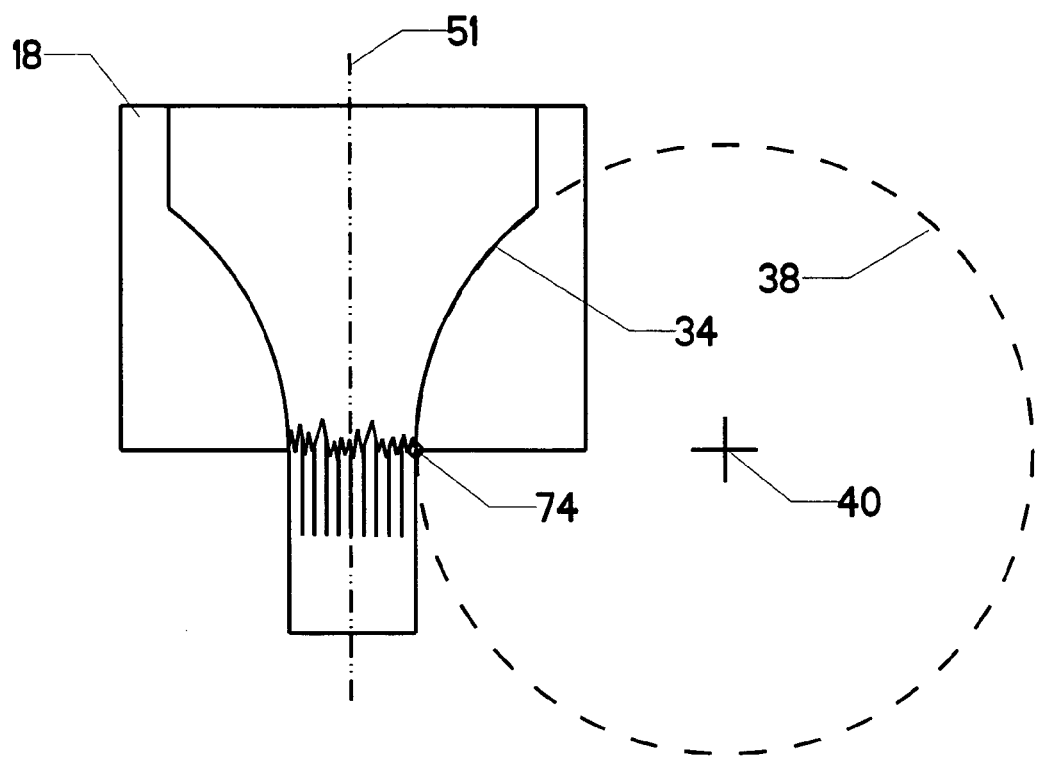
FIG. 6 is a sectioned elevation view, showing a prior art design using a wall profile incorporating a constant radius arc.
Figure 7:
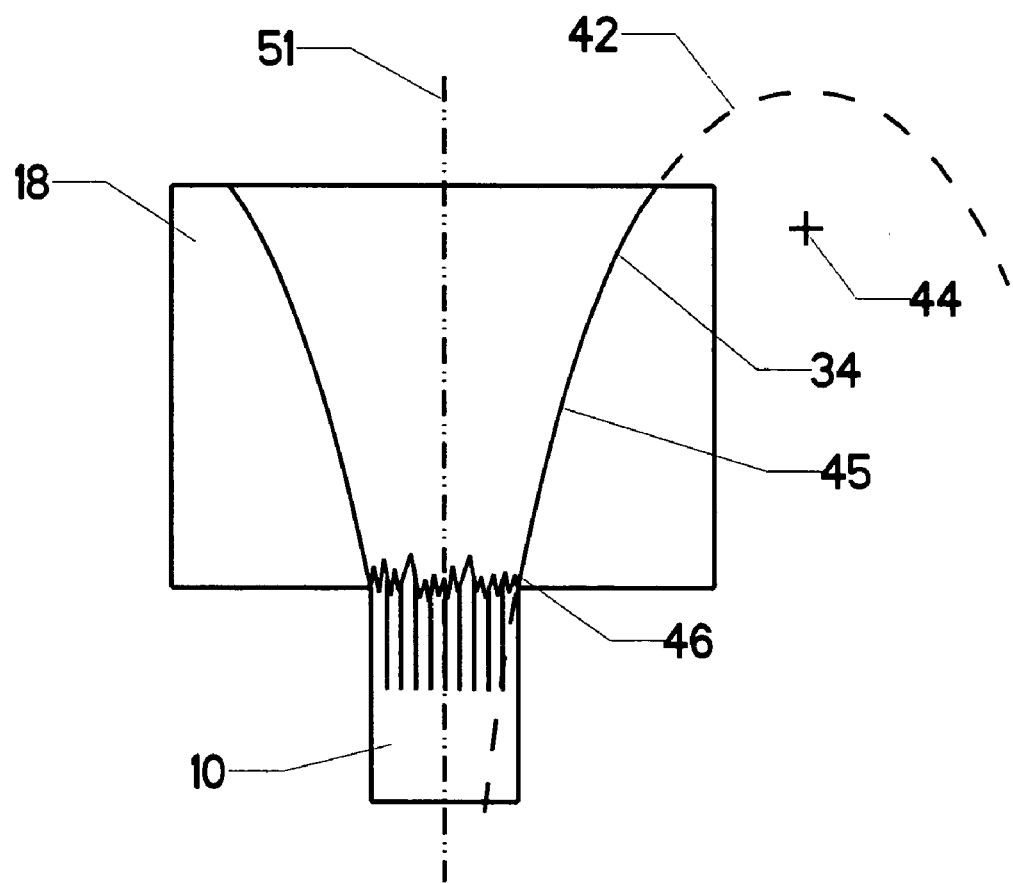
FIG. 7 is a sectioned elevation view, showing a prior art design using a wall profile incorporating a portion of a parabola.

| REFERENCE NUMERALS IN THE DRAWINGS | | | |
|---|---|---|---|
| 10 | cable | 14 | termination |
| 16 | potted region | 18 | anchor |
| 20 | potting transition | 22 | neck region |
| 24 | mid region | 26 | distal region |
| 28 | internal passage | 30 | flexible region |
| 32 | tangent wall | 34 | shoulder |
| 36 | extension wall | 38 | constant radius arc |
| 40 | arc center | 42 | parabola |
| 45 | parabolic wall | 46 | non-tangent condition |
| 48 | neck anchor boundary | 50 | distal anchor boundary |
| 51 | central axis | 52 | transition region |
| 54 | transition wall | 56 | parabola |
| 60 | outside cable wall | 64 | lateral offset |
| 66 | axis of symmetry | 68 | angular offset |
| 70 | longitudinal offset | 72 | straight wall |
| 73 | straight wall | 74 | tangency point |
| 78 | fillet | 80 | origin |
| 81 | curved wall | 82 | vertex |

DETAILED DESCRIPTION OF THE INVENTION

Figure 8:
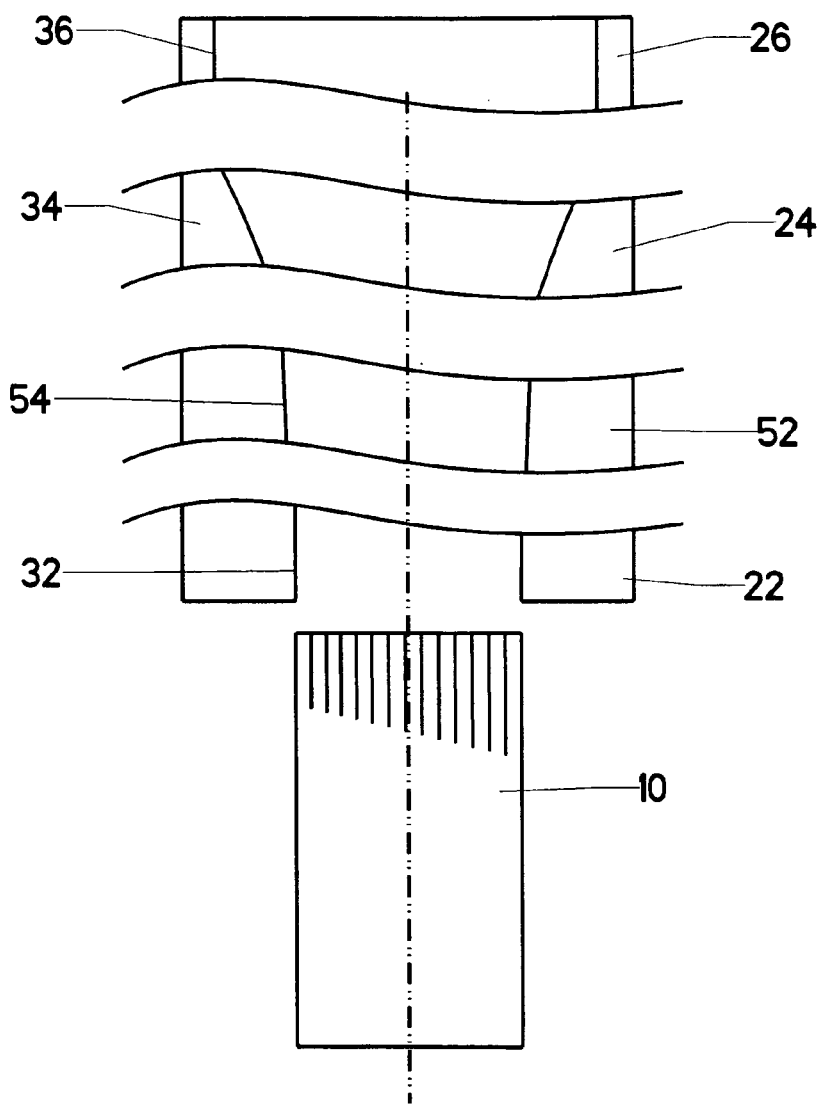
FIG. 8 is an exploded elevation view, showing the conflicting design constraints for different regions of a termination.

FIG. 8 shows a conceptualized view of an ideal anchor, having a wall profile optimized for each region within the anchor. One of the important concepts in the present invention is the fact that the wall slope must be suitably controlled between a tangent condition at the neck anchor boundary and the shoulder located in the mid region. This goal introduces the concept of a fourth region within the anchor. Thus, the anchor shown in FIG. 8 is divided into four regions: neck region 22, transition region 52, mid region 24, and distal region 26.

In optimizing an anchor, one should consider the wall profiles needed in each of these regions. As previously stated, the wall is preferably tangent to the cable's external diameter within neck region 22. Thus, tangent wall 32 is included. As also previously stated, the inclusion of shoulder 34 within mid region 24 is desirable. Transition region 52 has been identified between neck region 22 and mid region 24, because the inventors have discovered that the wall slope within this transition region is significant to the ultimate breaking strength of the termination. Transition wall 54 is a portion of the profile in which the slope varies in a controlled fashion between the slope of tangent wall 32 and the slope of shoulder 34.

It is preferable to have the wall slope over the neck region, the transition region, and the mid region controlled by a single function, rather than having to employ multiple functions with tangent conditions at the intersections between the functions. The inventors have discovered that a parabola can serve well in this capacity, provided that it is appropriately manipulated.

Figure 9:
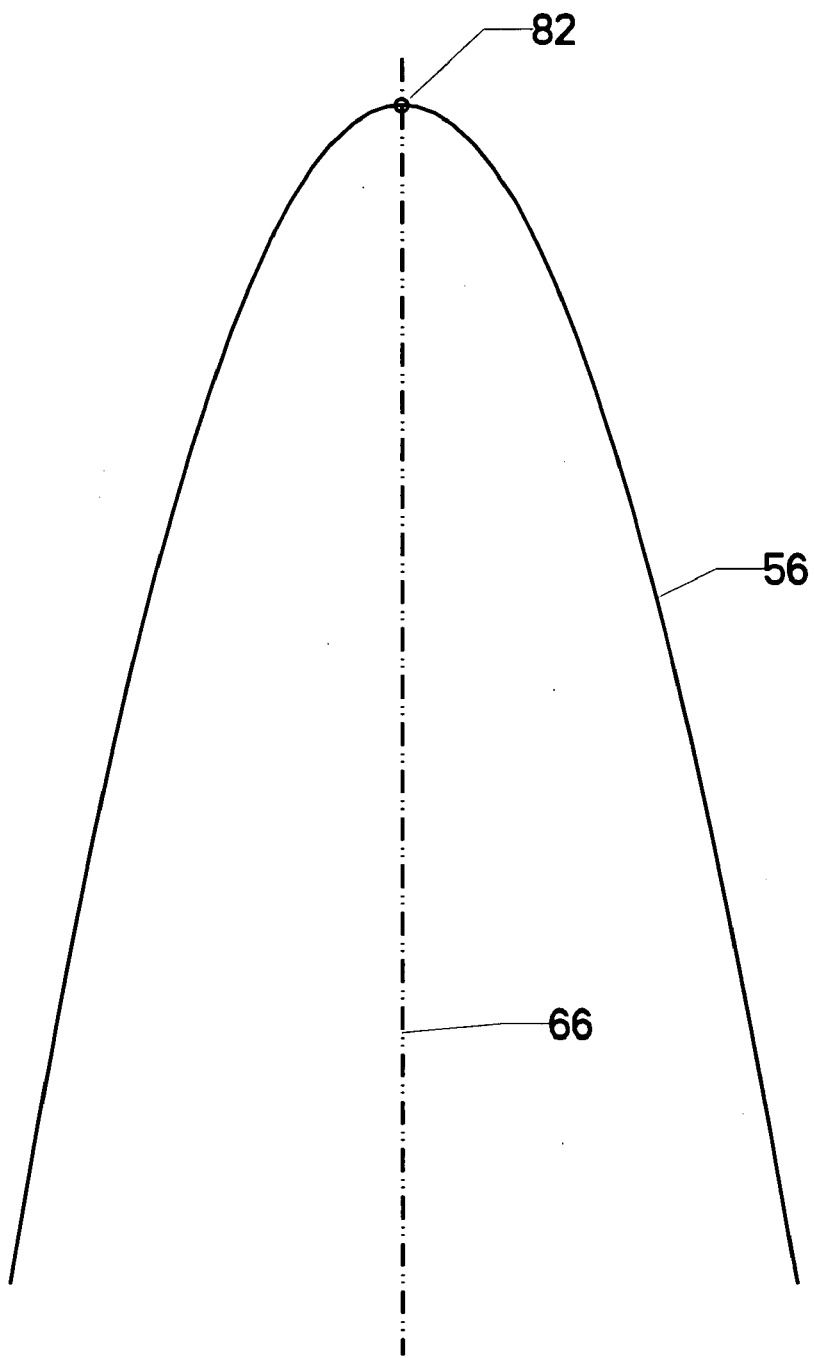
FIG. 9 is an elevation view, showing a parabola.

FIG. 9 shows parabola 56. It is symmetric about axis of symmetry 66, which passes through vertex 82. Being a vertically oriented parabola, it is described generally by the expression:

$$y=f(x)=Ax^2+Bx+C$$

Figure 10:
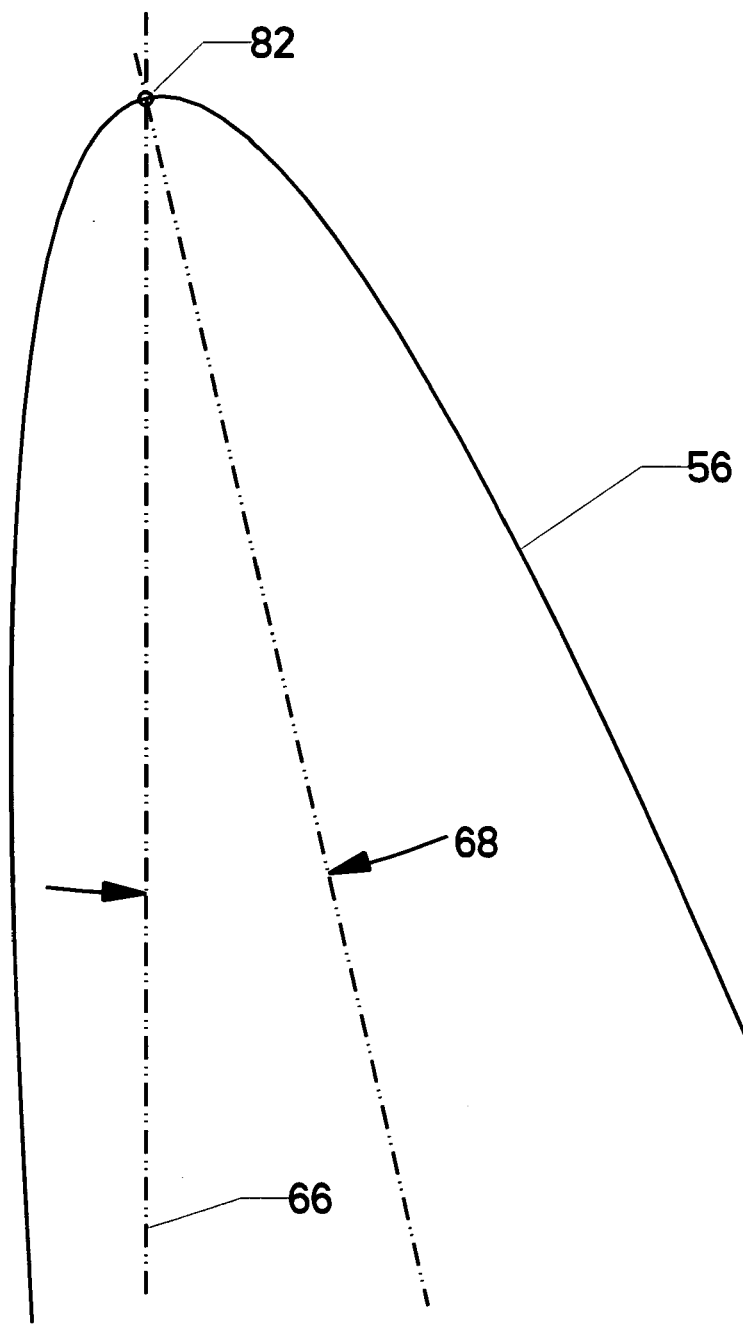
FIG. 10 is an elevation view, showing a parabola rotated about its vertex by an angular offset.

In order to be useful in creating appropriate wall geometry for a revolved wall profile, it is necessary to rotate the parabola shown in FIG. 9. FIG. 10 shows parabola 56 after it is rotated through angular offset 68 from the original orientation of axis of symmetry 66. The rotation is shown with vertex 82 being the center of rotation, but this need not always be the case.

Figure 11:
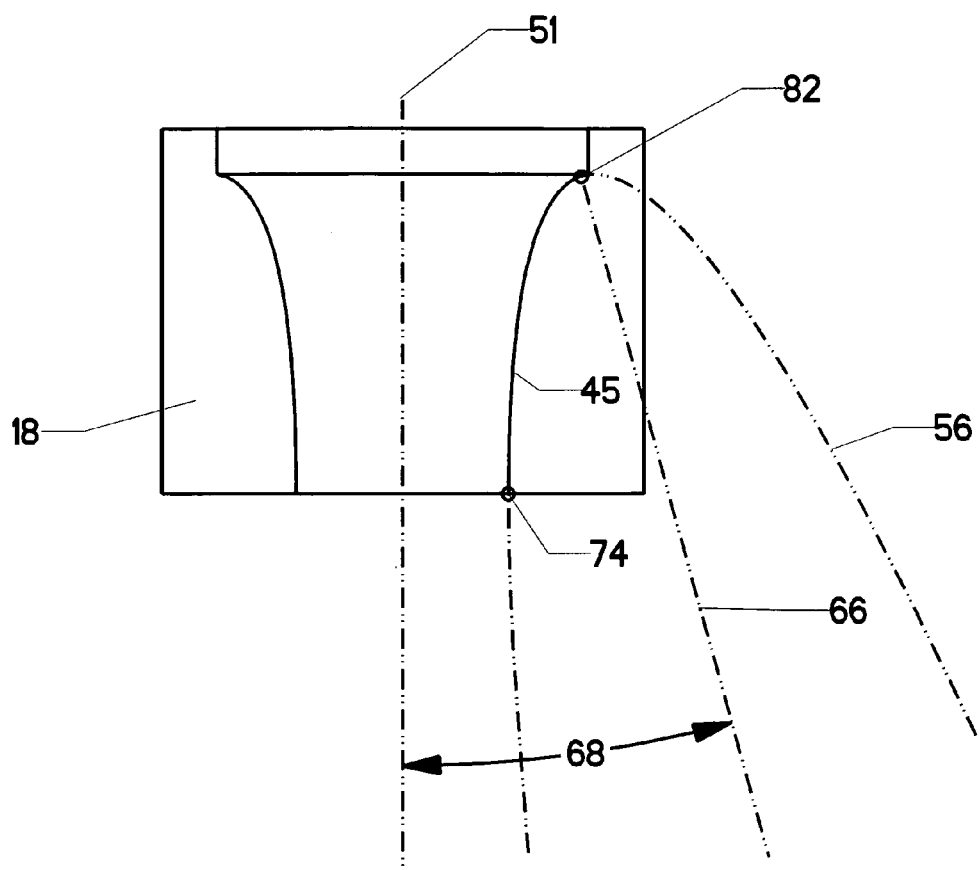
FIG. 11 is a sectioned elevation view, showing the use of a parabola to create a wall profile.

The reason for the angular offset may be readily discerned by studying FIG. 11. In this view, the reader will observe how parabola 56 has been angularly offset. Axis of symmetry 66 is angularly offset from central axis 51 of anchor 18. A portion of the parabola is then used to define parabolic wall 45, which is rotated around central axis 51 to define the shape of the internal passage. Inclining the parabola allows the creation of tangency point 74 at the neck anchor boundary (The tangency refers to the parabola being tangent to the cable exterior as the cable exits the anchor).

Figure 12:
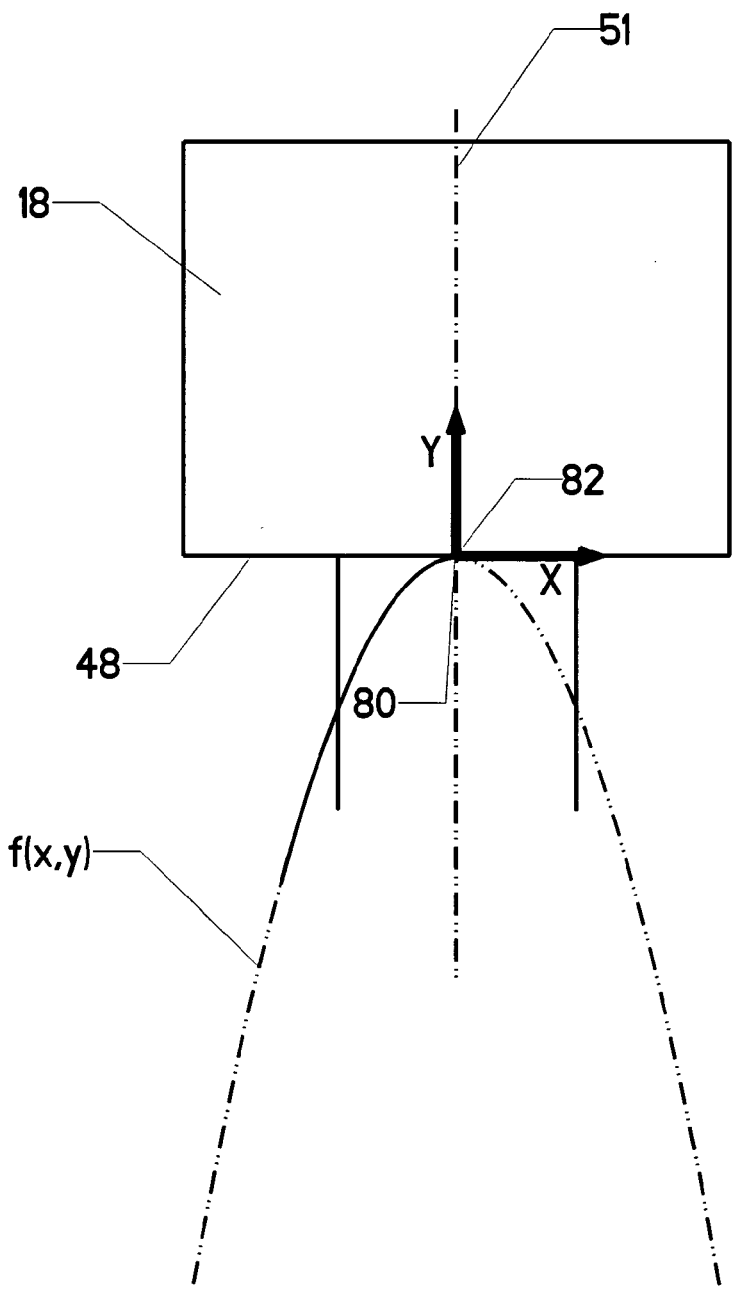
FIG. 12 is a sectioned elevation view, showing the placement of a parabola on the origin
Figure 13:
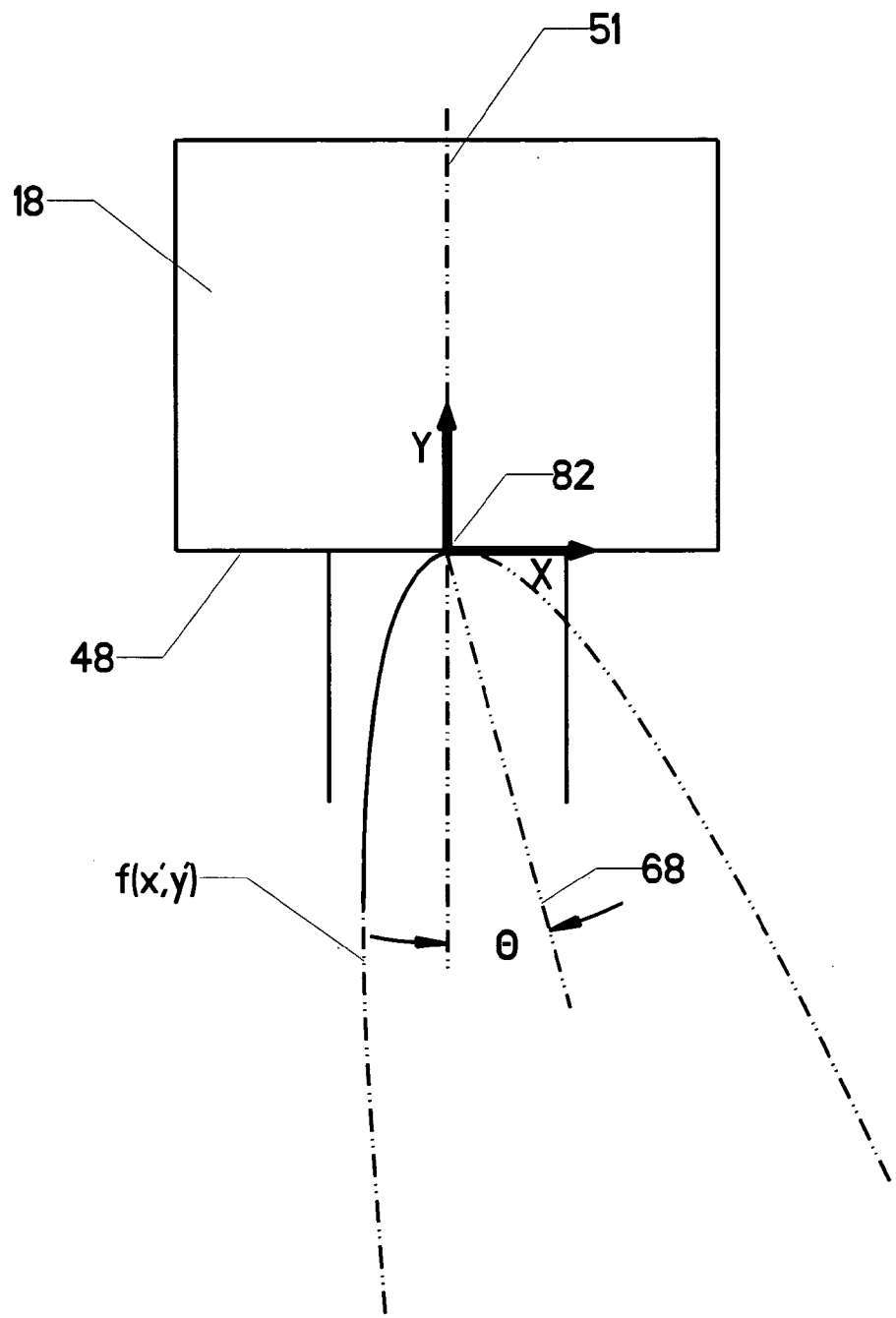
FIG. 13 is a sectioned elevation view, showing the rotation of the parabola of FIG. 11 to create a suitable angular offset.
Figure 14:
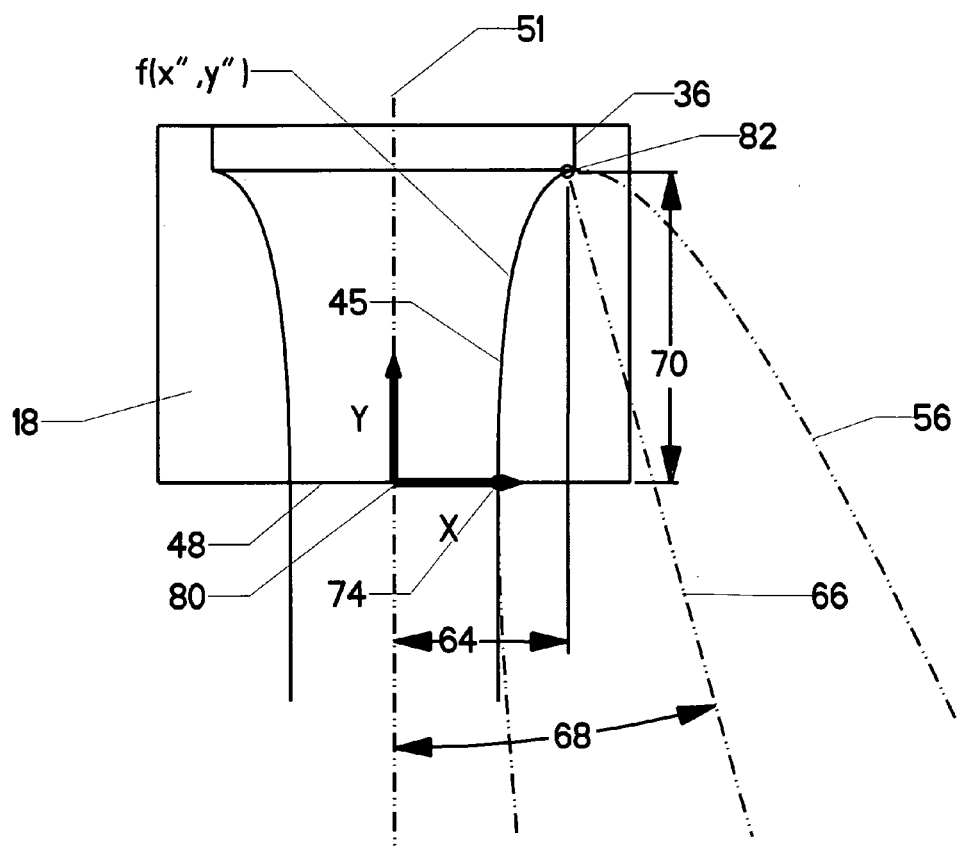
FIG. 14 is a sectioned elevation view, showing the translation of the parabola of FIG. 12 to a suitable position.

Of course, the parabola must be offset from the anchor's central axis in order to place it in the proper position. FIGS. 12 through 14 illustrate the translational and rotational offsets needed to put a portion of a parabola in an appropriate position for defining a wall profile. FIG. 12 shows an elevation view of anchor 18. A coordinate system having an origin 80 has been placed on the intersection of central axis 51 with neck anchor boundary 48. The location of the coordinate system is somewhat arbitrary, though the location selected is logical since it relates to the anchor's physical features.

A parabola is then defined according to the expression (with respect to the coordinate system shown in FIG. 12):

$$y=f(x)=Ax^2+Bx+C$$

Vertex 82 is placed on origin 80. In order to generate the geometry of FIG. 12, A must be negative and C must be zero (B can be zero, but can also be a finite positive or negative number). Of course, for each value of y, two values for x exist. Because this example only uses the left side of the parabola, only the negative values for x are used. The selected values represent the solid black parabolic line in the view (denoted as "f(x,y)").

In order to be useful in defining the wall profile, the parabola must be rotated with respect to central axis 51. FIG. 13 shows the parabola after it has been rotated through angular offset 68. Though the parabola can be rotated around any point, it is convenient to rotate around vertex 82. The rotated parabola is then defined as the function $f(x', y)$. If the amount of angular offset is θ, then the rotated function can be related to the original function by the following expressions:

$$x'=x \cos \theta - y \sin \theta$$

$$y'=x \sin \theta + y \cos \theta$$

The portion of the parabola must then be translated to an appropriate position with respect to central axis 51. FIG. 14 shows this step in the operation. Vertex 82, along with its associated portion of the parabola, has been translated a distance equal to lateral offset 64 in the X direction and a distance equal to longitudinal offset 70 in the Y direction. The translated and rotated parabola is then defined as the function $f(x'', y'')$. The translated and rotated parabola can then be related to the rotated parabola by the following expressions:

$$x''=x'+\text{Lat.Offset}$$

$$y''=y'+\text{Long.Offset}$$

Of course, only a portion of the parabola will be used in defining the wall profile (Since parabolas have infinite length, this statement must always be true). In FIG. 14, a thickened black line is used to indicate the portion of the parabola which is actually used to create the wall profile. This portion will be revolved around central axis 51 to create a revolved cut, which then defines a portion of the internal passage through the anchor.

Figure 15:
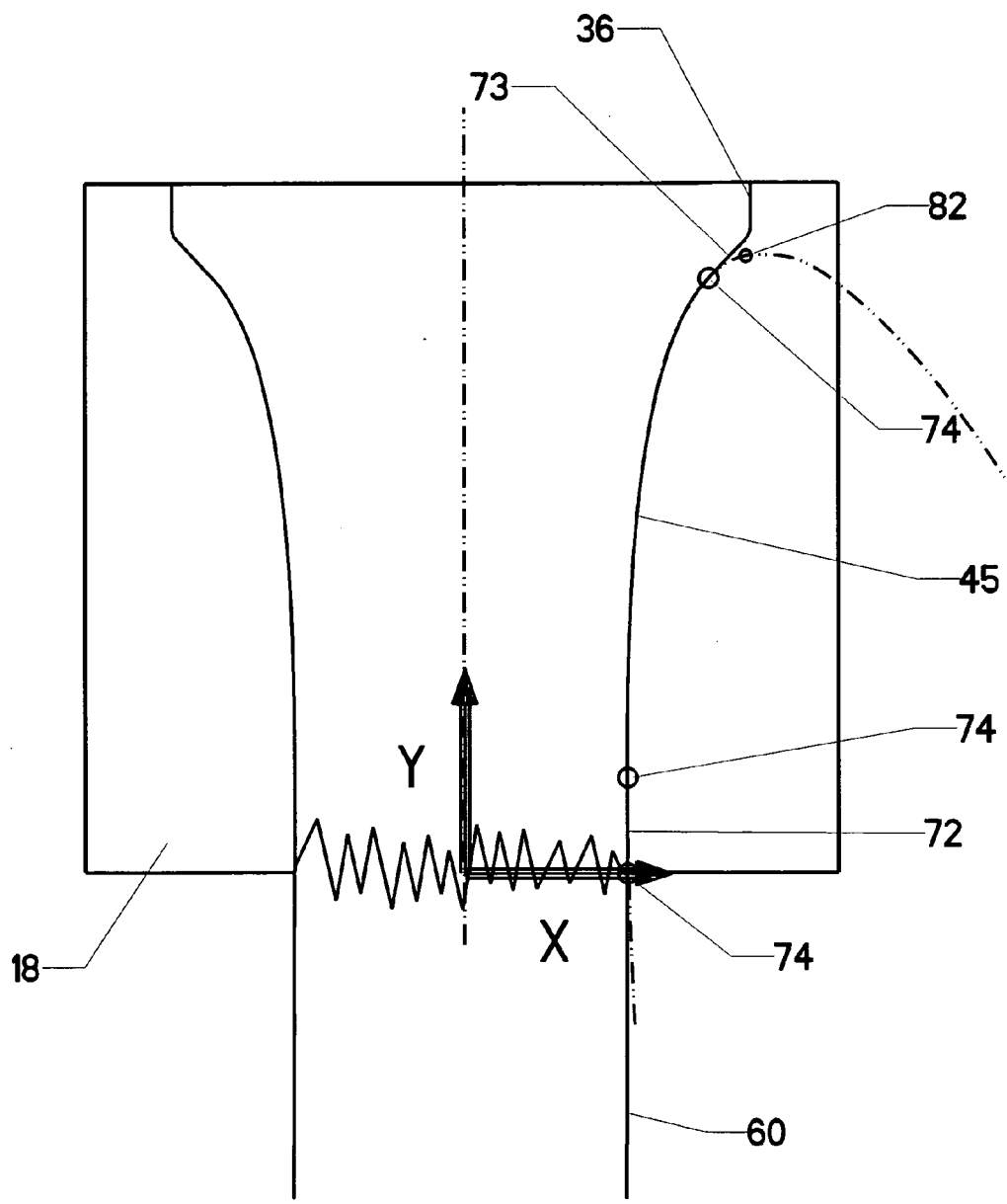
FIG. 15 is a sectioned elevation view, showing how a parabola can be combined with other geometry to create a wall profile.

In many instances it will be undesirable to use the parabola for the definition of the entire wall defining the internal passage. Thus, the parabolic portion will often be combined with other geometry. FIG. 15 shows an embodiment in which straight wall 72 is used near the neck anchor boundary. Tangency point 74 is preferably created between the straight wall and the beginning of the parabolic portion (the extreme of the parabolic portion lying closest to the neck anchor boundary). Straight wall 73 is positioned proximate the end of the parabolic portion (the extreme of the parabolic portion lying closest to the distal anchor boundary). A second tangency point 74 is preferably created between the end of the parabolic portion and straight wall 73. Extension wall 36 may also be included to extend the internal passage to the distal anchor boundary. This wall may be a straight portion, a portion which is inclined inward or outward, or any other suitable shape.

An anchor is typically created by a machining operation. Those skilled in the art will know that perfect tangency cannot be created between adjoining wall sections. Thus, the reader should understand that the term "tangent" encompasses near-tangent conditions as well.

Figure 16:
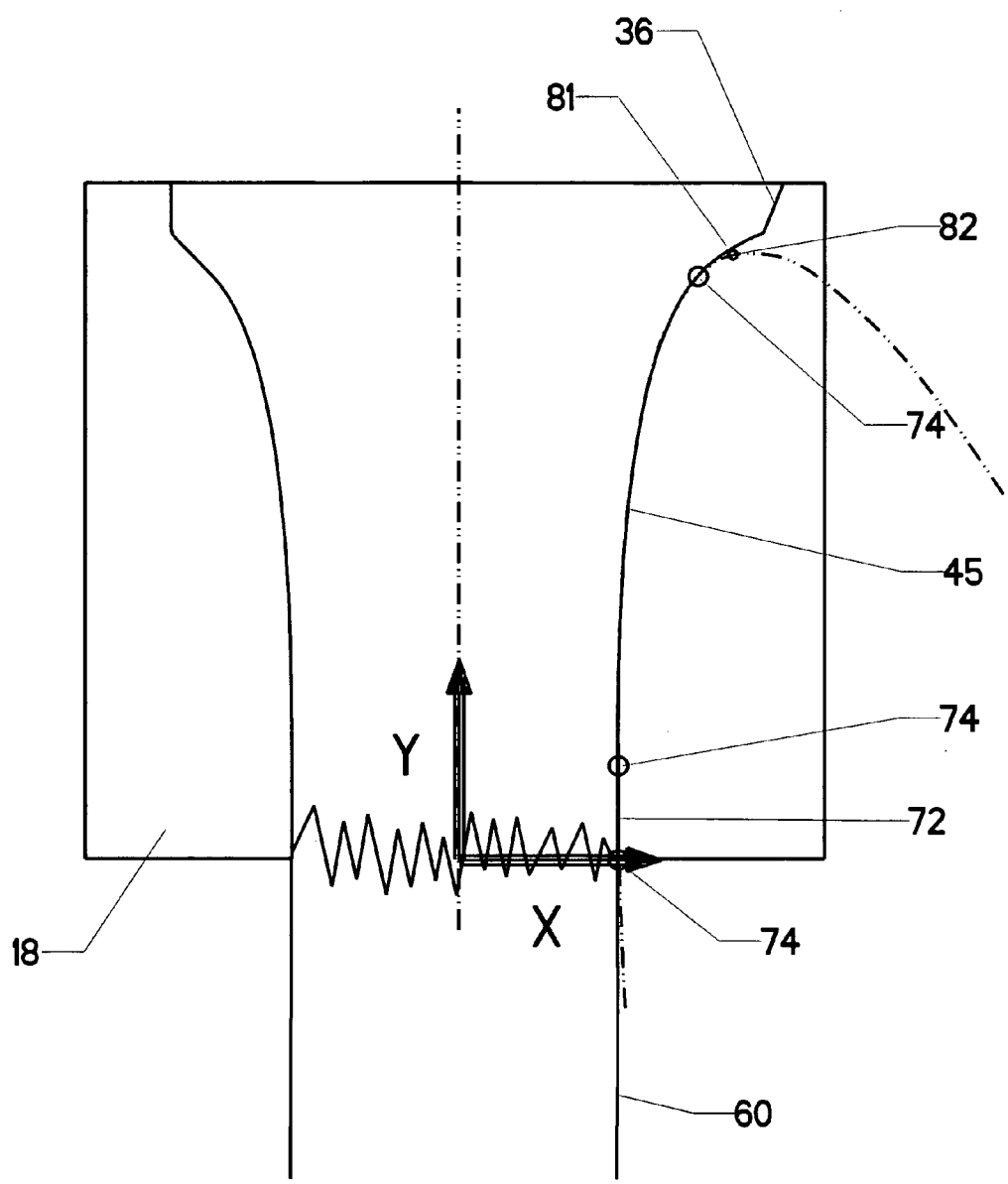
FIG. 16 is an elevation view, showing the geometry used to define a parabola's parameters.

FIG. 16 shows a combination of a parabolic wall profile with another type of geometry. Curved wall 81 is joined to the end of the parabolic portion. This intersection is preferably made tangent, resulting in another tangency point 74. An extension wall 36 may be used as well. The reader should bear in mind that these additional non-parabolic features are optional. Various curved walls and straight walls having various angles of inclination can be combined with the parabolic portion. The reader should also bear in mind that many more permutations of the features are possible than are shown in the illustrations, including a permutation in which the wall profile is all parabolic with no other types of geometry being used. The reader will thereby appreciate that an appropriately manipulated parabola can be advantageously used to create a portion of a revolved wall profile. The parabolic portion will have a beginning and an end, in which the beginning is closer to the neck anchor boundary and the end is closer to the distal anchor boundary. The beginning of the parabolic portion must be made tangent (or nearly tangent) to the outside of the cable. The end of the parabolic portion must have a slope which is steep enough to form a shoulder. These general considerations will dictate the parameters which define the parabola, the degree of angular offset, and the degree of translational offset.

The user may benefit from a specific example. Returning to FIG. 14, the parameters governing one specific embodiment will be explored. The cable to which the anchor is to be attached has a diameter of 0.250 inches. The anchor has an overall height of 0.500 inches. The extension wall has a height of 0.060 inches, meaning that parabolic wall 45 will have a height of 0.440 inches. The diameter of the internal passage at the junction between parabolic wall 45 and extension wall 36 is selected to be 0.400 inches. The angular offset for the parabola is selected to be 15 degrees. Parameters for the parabola must then be selected such that an appropriate slope is obtained at the neck anchor boundary and at the junction with extension wall 36.

Figure 17:
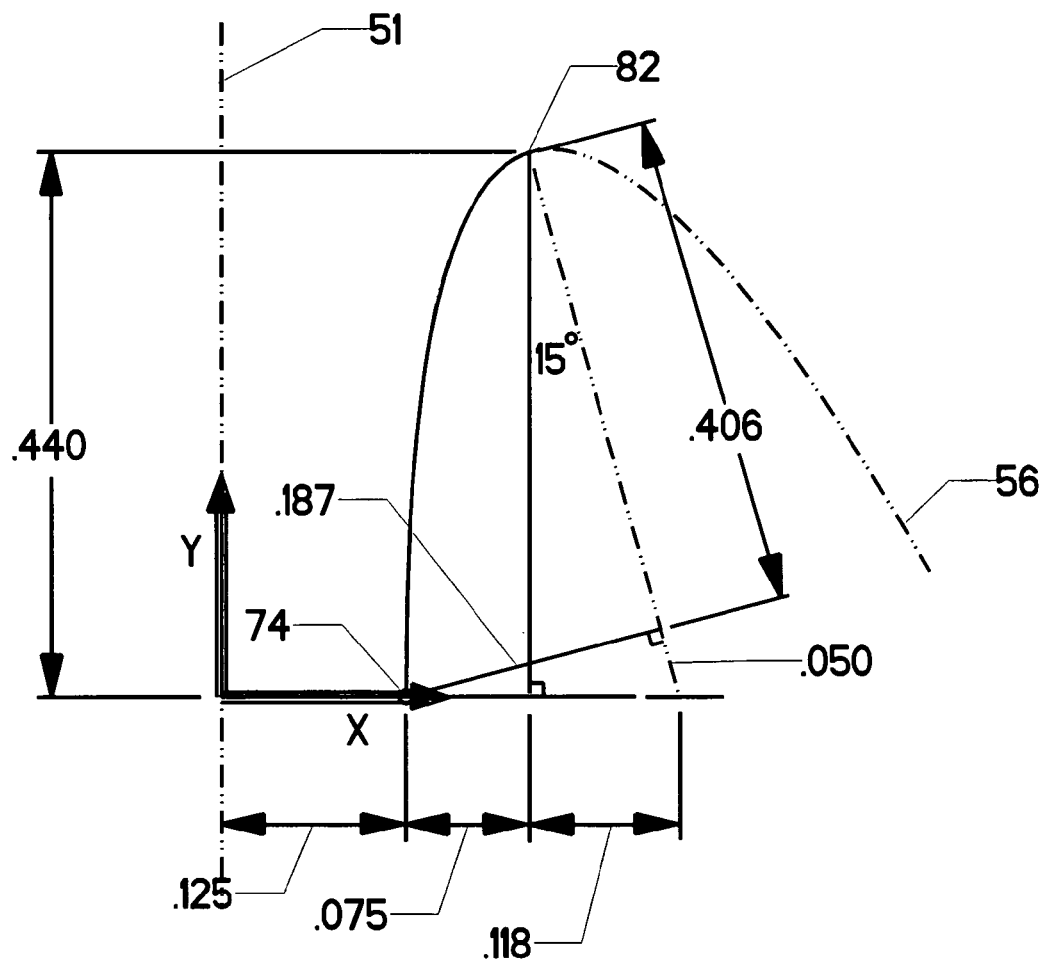
FIG. 17 is an elevation view, showing the geometry of FIG. 16 rotated to a vertical orientation.

FIG. 17 shows parabola 56 in an appropriate position with respect to central axis 51. The separation between tangency point 74 and vertex 82 is 0.440 inches in the Y direction. Simple trigonometry can be used to determine that the two points are separated a distance of 0.075 inches in the X direction. Other dimensions determined through trigonometric calculations are shown on FIG. 17.

Figure 18:
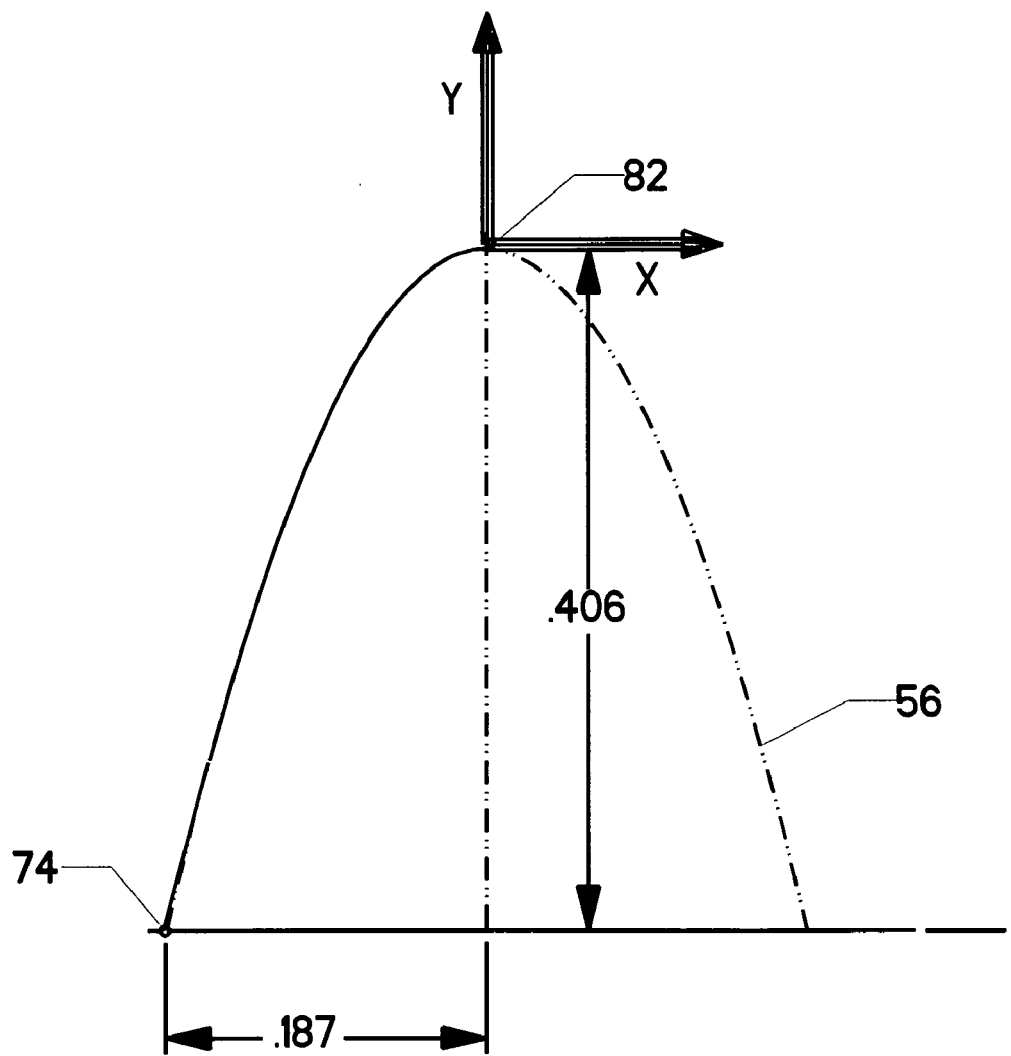
FIG. 18 is a graphical view, showing representative dimensions for the parabolic profile.

FIG. 18 shows the same parabola rotated to a vertical orientation with vertex 82 placed on the origin of the coordinate system. The parabola is defined by the general equation:

$$y=f(x)=Ax^2+Bx+C$$

Since the parabola's vertex is placed on the origin, C must be zero. Several other things are known. These are: (1) when x=0, y=0; (2) when x=−0.187, y=−0.406; and (3) when x=−0.187, dy/dx=3.372.

Knowing these facts allows the parameters governing the parabola to be determined, with the result being:

$$y=f(x)=-9.979 \cdot x^2+0.3050 \cdot x$$

The parabola must then be rotated by 15 degrees, which is reflected in the following expression:

$$x'=x \cos 15 - y \sin 15$$

$$y'=x \sin 15 + y \cos 15$$

Finally, the parabola must be translated to the appropriate position, which is reflected in the following expression:

$$x''=x'+\text{Lat.Offset}$$

$$y''=y'+\text{Long.Offset}$$

A portion of the parabola is then used to define part of the revolved wall profile, such as illustrated in FIG. 14.

Although the preceding description contains significant detail, it should not be construed as limiting the scope of the invention but rather as providing illustrations of the preferred embodiments of the invention. As an example, the wall profile features described in the disclosure could be mixed and combined to form many more permutations than those illustrated. The claims language to follow describes many profiles in terms of precise mathematical functions. Those skilled in the art will know that when actual parts are manufactured, these mathematical functions will be approximated and not recreated exactly. Thus, the language used in the claims is intended to describe the general nature of the wall profiles. It will be understood that physical examples of anchors falling under the claims may deviate somewhat from the precise mathematical equations.

The invention claimed is:

1. An anchor for use in creating a termination on a cable having a diameter, comprising:
   a. a neck anchor boundary;
   b. a distal anchor boundary;
   c. an internal passage between said neck anchor boundary and said distal anchor boundary;
   d. wherein said passage is defined by a revolved wall profile which is revolved around a central axis running through said internal passage; and
   e. wherein at least a portion of said wall profile is defined by a portion of a parabola having a vertex and an axis of symmetry; and
   f. wherein said vertex is laterally offset from said central axis; and
   g. wherein said axis of symmetry is angularly offset from said central axis.

2. An anchor as recited in claim 1, wherein:
   a. said parabolic portion of said wall profile begins proximate said neck anchor boundary; and
   b. at the beginning of said parabolic portion, the diameter of said internal passage is approximately equal to said diameter of said cable.

3. An anchor as recited in claim 2, wherein said revolved wall profile further comprises a straight wall lying between said neck anchor boundary and said beginning of said parabolic portion, wherein said straight wall is tangent to said parabolic portion at said beginning of said parabolic portion.

4. An anchor as recited in claim 2, wherein:
a. said parabolic portion has a beginning and an end;
b. said end of said parabolic portion lies proximate said distal anchor boundary; and
c. said revolved wall profile further comprises a tangent wall lying between said end of said parabolic portion and said distal anchor boundary, with said tangent wall being tangent to said end of said parabolic portion.

5. An anchor as recited in claim 2, wherein:
a. said parabolic portion has a beginning and an end;
b. said end of said parabolic lies proximate said distal anchor boundary; and
c. said revolved wall profile further comprises a curved wall lying between said end of said parabolic portion and said distal anchor boundary, with said curved wall being tangent to said end of said parabolic portion.

6. An anchor as recited in claim 1, wherein:
a. said parabolic portion has a beginning and an end;
b. said beginning of said parabolic portion lies proximate said neck anchor boundary; and
c. said beginning of said parabolic portion is tangent to said diameter of said cable.

7. An anchor as recited in claim 1, wherein:
a. said parabolic portion has a beginning and an end; and
b. said end of said parabolic portion lies proximate said distal anchor boundary.

8. An anchor as recited in claim 7, wherein said revolved wall profile further comprises an extension wall lying between said end of said parabolic portion and said distal anchor boundary.

9. An anchor as recited in claim 8, wherein said extension wall and said end of said parabolic portion are joined by a fillet.

10. An anchor as recited in claim 1, wherein said revolved wall profile further comprises a straight wall lying between said neck anchor boundary and said parabolic portion, wherein said straight wall is tangent to said parabolic portion.

11. An anchor as recited in claim 10, wherein:
a. said parabolic portion has a beginning and an end; and
b. said end of said parabolic portion lies proximate said distal anchor boundary.

12. An anchor as recited in claim 11, wherein said revolved wall profile further comprises an extension wall lying between said end of said parabolic portion and said distal anchor boundary.

13. An anchor as recited in claim 12, wherein said extension wall and said end of said parabolic portion are joined by a fillet.

14. An anchor for use in creating a termination on a cable having a diameter, comprising:

a. a neck anchor boundary;
b. a distal anchor boundary;
c. an internal passage between said neck anchor boundary and said distal anchor boundary;
d. wherein said passage is defined by a revolved wall profile revolved around a central axis;
e. a coordinate system having an origin on the intersection between said neck anchor boundary and said central axis, wherein said coordinate system includes an x axis extending perpendicularly to said central axis and a y axis extending along said central axis;
f. wherein the variable x is defined as the radius of said revolved wall profile at any distance y along said y axis;
g. wherein at least a portion of said wall profile is defined by a parabola having a vertex and an axis of symmetry;
h. wherein said vertex of said parabola is offset a distance Lat.Offset in the x direction from said origin and a distance Long.Offset in the y direction from said origin; and
g. wherein said axis of symmetry of said parabola is angularly offset from said central axis.

15. An anchor as recited in claim 14, wherein:
a. said parabolic portion of said revolved wall profile begins proximate said neck anchor boundary; and
b. at the beginning of said parabolic portion of said revolved wall profile, the diameter of said internal passage is approximately equal to said diameter of said cable.

16. An anchor as recited in claim 15, further comprising a straight wall portion lying between said neck anchor boundary and said beginning of said parabolic portion.

17. An anchor as recited in claim 14, wherein:
a. said parabolic portion of said revolved wall profile has a beginning and an end; and
b. said end of said parabolic portion of said revolved wall profile lies proximate said distal anchor boundary.

18. An anchor as recited in claim 17, further comprising an extension wall lying between said end of said parabolic portion and said distal anchor boundary.

19. An anchor as recited in claim 18, wherein said extension wall and said end of said parabolic portion are joined by a fillet.

20. An anchor as recited in claim 17, further comprising a first straight wall portion lying between said neck anchor boundary and said beginning of said parabolic portion of said revolved wall profile, wherein said first straight wall portion is tangent to said parabolic portion of said revolved wall profile at said beginning of said parabolic portion of said revolved wall profile.

21. An anchor as recited in claim 20, further comprising a second straight wall portion lying between said end of said parabolic portion of said revolved wall profile and said distal anchor boundary.

* * * * *